United States Patent [19]

Krabbenhoft et al.

[11] Patent Number: 5,209,425
[45] Date of Patent: May 11, 1993

[54] SINGLE REEL CARTRIDGE WITH THINNER COVER AND LEADER BLOCK AREA DIMENSIONAL STABILITY

[75] Inventors: Steven E. Krabbenhoft, Breckenridge, Minn.; Curtis G. LeNoue, Wahpeton, N. Dak.; Saurin J. Shah, Wahpeton, N. Dak.; Steven J. Fisher, Wahpeton, N. Dak.

[73] Assignee: Minnesota Mining and Manufacturing Company, St. Paul, Minn.

[21] Appl. No.: 756,073

[22] Filed: Sep. 6, 1991

[51] Int. Cl.$^5$ .............................................. G11B 33/00
[52] U.S. Cl. .................................................... 242/197
[58] Field of Search .................... 242/195, 197, 199; 360/132

[56] References Cited

U.S. PATENT DOCUMENTS

| | | | |
|---|---|---|---|
| 4,383,660 | 5/1983 | Richard et al. | 242/197 |
| 4,426,047 | 1/1984 | Richard et al. | 242/197 |
| 4,452,406 | 6/1984 | Richard | 242/195 |
| 4,775,115 | 10/1988 | Gelardi | 242/195 |

Primary Examiner—Daniel P. Stodola
Assistant Examiner—John Q. Nguyen
Attorney, Agent, or Firm—Gary L. Griswold; Walter N. Kirn; Charles D. Levine

[57] ABSTRACT

A single reel data tape cartridge includes a base and a cover. The cover includes a rear wall, two opposing side walls, a front wall, and an upper wall connecting the rear, front, and side walls. The upper wall has an upper surface and a lower surface. A leader block area is formed in one of the corners of the upper wall and a strengthening rib is formed on the lower surface of the upper wall adjacent the leader block area. The strengthening rib partially encloses the leader block area. The portion of the upper wall adjacent the strengthening rib and outside of the leader block area is at least thicker than the portion of the upper wall in the leader block area.

10 Claims, 2 Drawing Sheets

SINGLE REEL CARTRIDGE WITH THINNER COVER AND LEADER BLOCK AREA DIMENSIONAL STABILITY

TECHNICAL FIELD

The present invention relates to tape cartridge covers. More particularly, the present invention relates to tape cartridge covers for use in single reel cartridges.

BACKGROUND OF THE INVENTION

Single reel data tape cartridges, known as 3480 type cartridges, include a reel containing a plurality of layers of magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered.

The leader block is generally rectangular and has a cutout which combines with a pin to hold the tape. The front surface of the leader block includes a slot for engaging an automatic threading apparatus in a reel-to-reel magnetic tape drive apparatus. The front surface of the leader block is generally cylindrical and has a rounded boss which engages with an inclined surface of the corner of the cartridge. The rear surface is rounded to form a portion of an arc of a radius to match the periphery of the takeup reel hub in the tape drive apparatus as the leader block fits into the slot in the hub. A compliant section may be formed on the leader block to permit the leader block to compress at its rear surface to accommodate especially the first layer of tape when the tape is wound onto the take-up reel.

The tape drive apparatus includes a threading apparatus for connection to a single reel tape cartridge. The drive apparatus includes a drive motor for the supply reel mounted beneath a base plate so that its shaft extends normal to and slightly above a surface of the base plate. A take-up reel is mounted on the base plate and is attached to the motor. The cartridge reel, when coupled to the motor, lies in substantially the same plane as a hub of the take-up reel so that the tape moves in a plane normal to both motor shafts when being transported. After the threading of the tape, transfer of the tape between the supply reel and the take-up reel is achieved by controlling the driving motors for the reels. The tape passes a roller guide, an air bearing guide, a magnetic transducer head, a second air bearing guide, and a roller of a tension transducer.

The cartridge is formed of a base and a cover. The base includes a rear wall, two opposing side walls, a front wall, and a lower wall connecting the rear, front, and side walls. The cover includes a rear wall, two opposing side walls, a front wall, and an upper wall connecting the rear, front, and side walls. The upper wall has an upper surface and a lower surface. The upper surface has a substantially rectangular recessed portion which is adapted to receive an identifying label and to receive ribs on the base of an adjacent cartridge when a plurality of cartridges are stacked one on top of the other. The thickness of the upper wall is substantially constant, generally being 0.20 cm (0.08 in) thick except for the 0.05 cm (0.02 in) deep recess.

There is a need to provide cartridge covers that are thinner without sacrificing any of the strength of the currently-dimensioned covers. There is also a need for a cartridge cover with a thinner wall in the leader block area to improve the dimensional stability of the slot width in the leader block area to yield consistent leader block insertion and removal forces. No known cartridges have either of these features and, therefore, there are no known cartridges having both of these features.

SUMMARY OF THE INVENTION

A single reel data tape cartridge according to the present invention includes a reel containing a plurality of layers of magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered. The cartridge is formed of a base and a cover. The base includes a rear wall, two opposing side walls, a front wall, and a lower wall connecting the rear, front, and side walls.

The cover includes a rear wall, two opposing side walls, a front wall, and a substantially rectangular upper wall connecting the rear, front, and side walls. The upper wall has an upper surface and a lower surface. A leader block area is formed in one of the corners of the upper wall and a strengthening rib is formed on the lower surface of the upper wall adjacent the leader block area. The leader block area includes a plurality of ribs extending from the lower surface of the upper portion to assist at least one of the insertion, removal, and housing of a leader block.

The strengthening rib at least partially encloses the leader block area. The portion of the upper wall adjacent the strengthening rib and outside of the leader block area is at least as thick as the portion of the upper wall in the leader block area. Preferably, the portion of the upper wall adjacent the strengthening rib and outside of the leader block area is thicker than the portion of the upper wall in the leader block area such that the portion of the upper wall in the leader block area is at least 40% thinner.

DETAILED DESCRIPTION OF PREFERRED EMBODIMENTS

Figure 1:
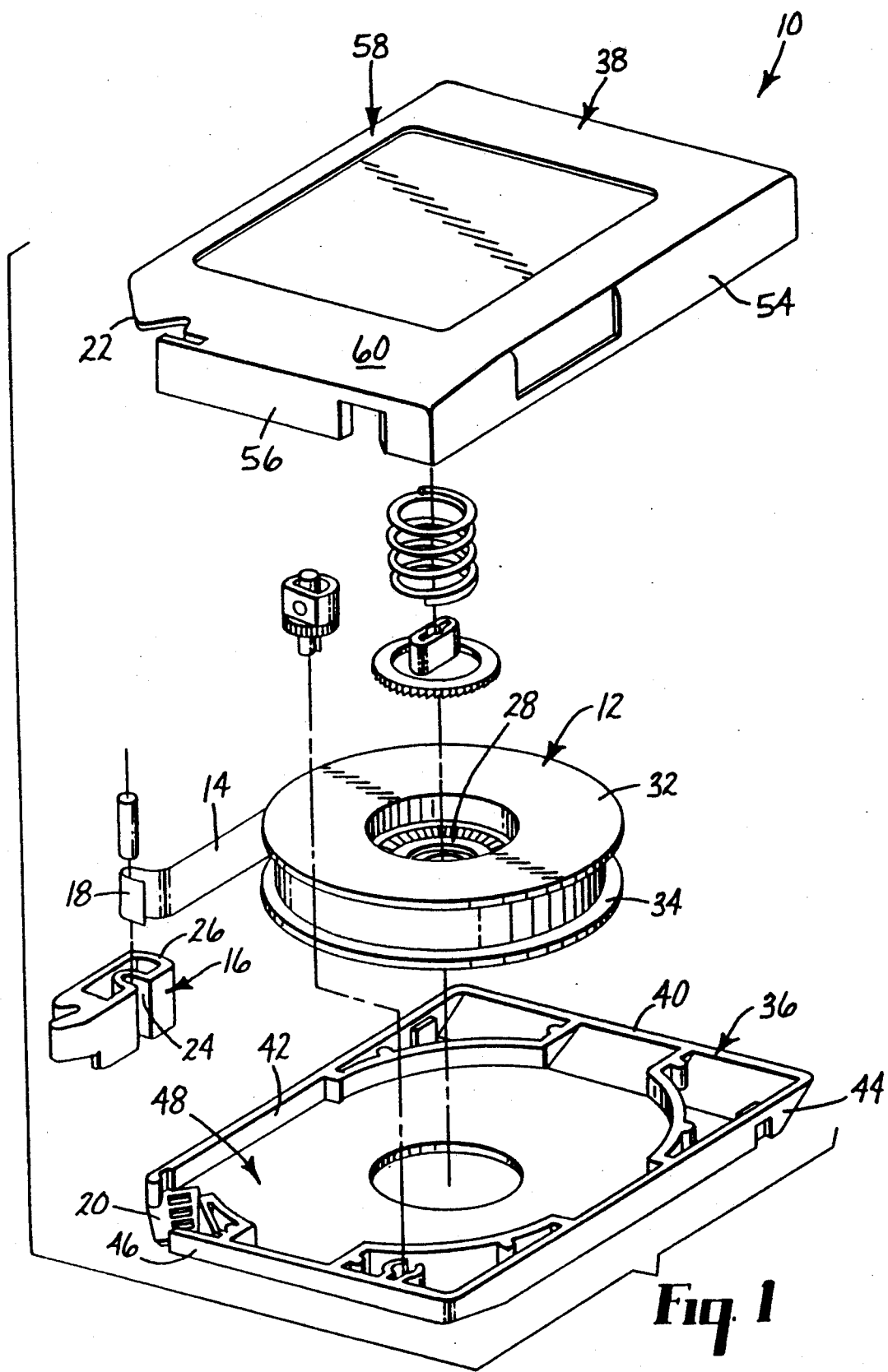
FIG. 1 is a perspective view of a single reel tape cartridge having a cover of the present invention.

A single reel data tape cartridge 10, such as a 3480 type tape cartridge shown in FIG. 1, includes a tape reel 12 containing a plurality of layers of magnetic tape 14 with a leader block 16 attached to the free end 18 of the tape 14 as it extends from the reel 12. The tape reel 12 includes a cylindrical hub having a cylindrical tape winding surface, an upper flange mounted on one axial end of the hub, and a lower flange mounted on the other axial end of the hub. The cartridge 10 is generally rectangular except for one corner 20 which is angled and includes a leader block window 22. The leader block window 22 holds the leader block 16 and is an opening for the tape 14 to exit from the cartridge 10 for threading through a tape drive when the leader block 16 is removed. When the leader block 16 is snapped into the window 22, the window 22 is covered.

The front surface of the leader block 16 includes a slot 24 for engaging an automatic threading apparatus of a reel-to-reel magnetic tape drive apparatus and engages an inclined surface of the corner of the cartridge. The rear surface is rounded 26 to form a portion of an arc of a radius to match the periphery of the takeup reel hub in the tape drive apparatus as the leader block 16 fits into the slot in the hub. A compliant section may be formed on the leader block 16 to permit the leader block 16 to compress at its rear surface to accommodate especially the first layer of tape 14 when the tape 14 is wound onto the take-up reel.

The tape reel 12 includes a cylindrical hub 28 having a cylindrical tape winding surface, an upper flange 32 mounted on one axial end of the hub, and a lower flange 34 mounted on the other axial end of the hub.

Figure 2:
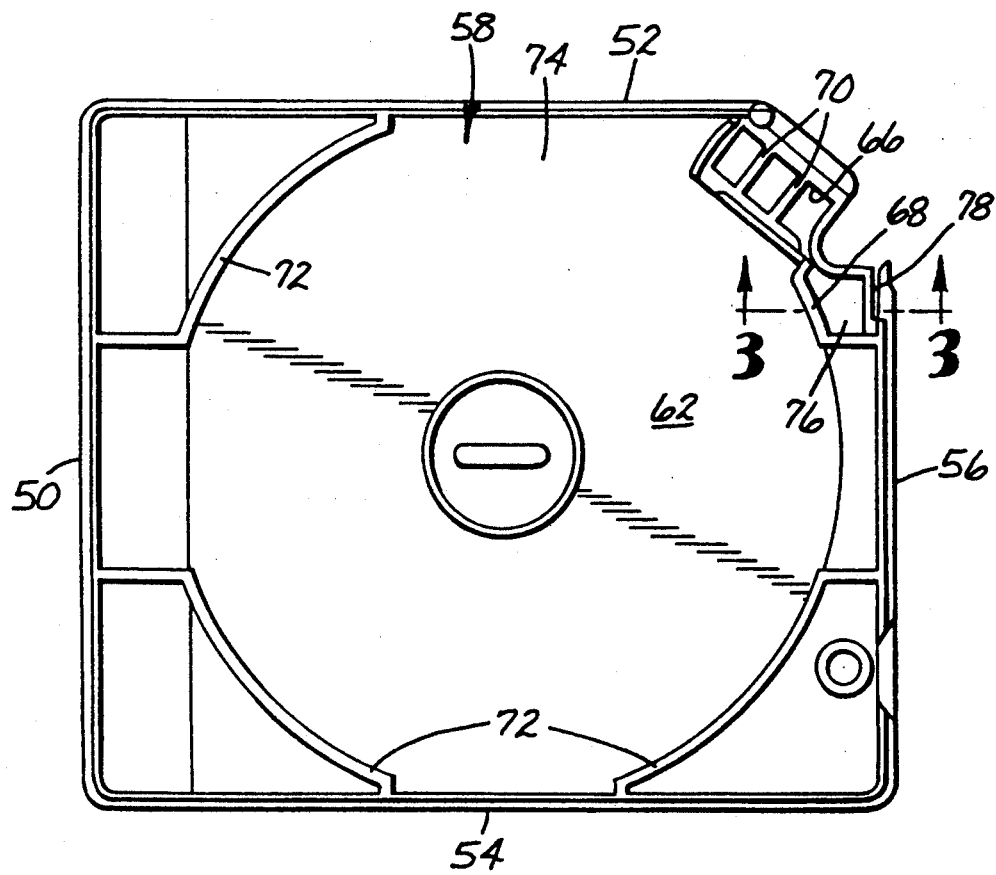
FIG. 2 is a bottom view of a single reel tape cartridge having a cover of the present invention.

The cartridge 10 is formed of a base 36 and a cover 38. The base 36 includes a rear wall 40, two opposing side walls 42, 44, a front wall 46, and a lower wall 48 connecting the rear, front, and side walls. Referring to FIG. 2, the cover 38 includes a rear wall 50, two opposing side walls 52, 54, a front wall 56, and an upper wall 58 connecting the rear, front, and side walls.

Figure 3:
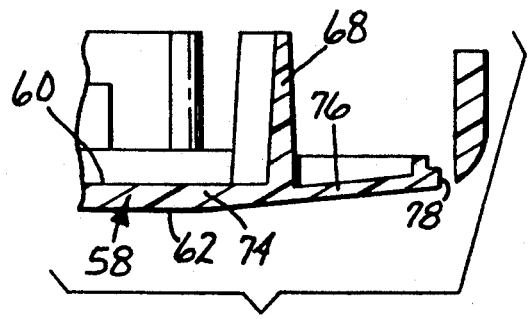
FIG. 3 is a cross-sectional view of the cover taken along line 3—3 of FIG. 2.

The upper wall 58 of the cover 38 has an upper surface 60 and a lower surface 62, as shown in FIG. 3. The upper surface 60 has a substantially rectangular recessed portion 64 which is adapted to receive an identifying label and to receive ribs on the base of an adjacent cartridge when a plurality of cartridges are stacked one on top of the other.

A leader block area 66 is formed in the leader block corner 20 of the upper wall 58 between the front wall 56 and one of the side walls 52 of the cover 38. A strengthening rib 68 is formed on the lower surface 62 of the upper wall 58 adjacent the leader block area 66. The leader block area 66 includes a plurality of ribs 70 extending from the lower surface 62 of the upper wall 58 to assist at least one of the insertion, removal, and housing of the leader block 16. Strengthening ribs 72 also may be formed in any or all of the other three corners of the lower surface 62 of the upper wall 58.

The strengthening rib 68 adjacent the leader block area 66 partially encloses and defines the leader block area 66. The portion 74 of the upper wall 58 adjacent the strengthening rib 68 and outside of the leader block area 66 is at least as thick as the portion 76 of the upper wall 58 in the leader block area 66. Preferably, the portion 74 of the upper wall 58 adjacent the strengthening rib 68 and outside of the leader block area 66 is thicker than the portion 76 of the upper wall 58 in the leader block area 66 such that the portion 76 of the upper wall 58 in the leader block area 66 is at least 40% thinner.

Figure 4:
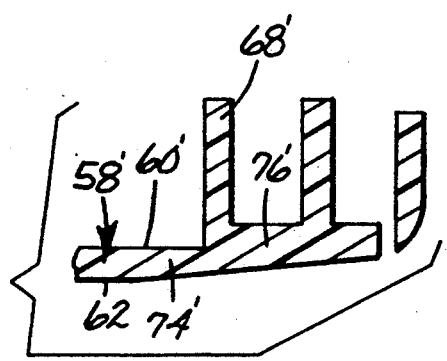
FIG. 4 is a cross-sectional view of a prior art cartridge cover.

The thinner wall portion 76 in the leader block area 66 is a vast improvement over the prior art designs in which the leader block area 66 typically includes the thickest portion of the cover 38. As shown in FIG. 4, the thickness of the cover 38 in the leader block area 66 of known covers reaches a maximum of 0.396 cm (0.156 in). This wall portion 76' is adjacent the slot 78 whose width is a critical dimension which affects the cartridge performance. The slot width dictates the magnitude of the leader block insertion and removal force required to insert and remove the leader block 16 into and remove the leader block 16 from the leader block area 66. This force is a critical drive/cartridge interaction parameter. By reducing the plastic mass in this area by reducing the thickness of the cover upper wall 58 as illustrated in FIG. 3, the dimensional stability of the slot width is significantly improved. The improved dimensional stability reduces the variation dependency of the width of the slot 80 with process variations. This, in turn, yields consistent leader block insertion and removal forces. This also helps reduce material usage and costs and decreases the cycle time for processing parts.

A further modification of the cartridge cover 38 is that it is thinner than known covers. The cover 38 is reduced to a maximum total thickness of 0.18 cm (0.07 in) from the 0.20 cm (0.08 in) thickness of conventional cartridge covers. This reduces manufacturing costs and requires less material. This cartridge cover 38 is thinner than existing covers without sacrificing any of the strength or flexibility requirements of the currently-dimensioned covers.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

We claim:

1. A cartridge cover for use in a single reel tape cartridge insertable into a tape drive apparatus, the cartridge cover comprising:
    a rear wall;
    two opposing side walls;
    a front wall;
    a substantially rectangular upper wall connecting the rear, front, and side walls, wherein the upper wall has an upper surface, a lower surface, and four corners;
    a leader block area formed in one of the corners of the upper wall; and
    a strengthening rib formed on the lower surface of the upper wall adjacent the leader block area;
    wherein the portion of the upper wall adjacent the strengthening rib and outside of the leader block area is at least as thick as the portion of the upper wall in the leader block area.

2. The cartridge cover of claim 1 wherein the portion of the upper wall in the leader block area is thinner than the portion of the upper wall adjacent the strengthening rib and outside of the leader block area.

3. The cartridge cover of claim 2 wherein the portion of the upper wall in the leader block area is at least 25% thinner than the portion of the upper wall adjacent the strengthening rib and outside of the leader block area.

4. The cartridge cover of claim 2 wherein the portion of the upper wall in the leader block area is at least 40% thinner than the portion of the upper wall adjacent the strengthening rib and outside of the leader block area.

5. The cartridge cover of claim 1 wherein the leader block area comprises a plurality of ribs extending from the lower surface of the upper wall to assist at least one of the insertion, removal, and housing of a leader block.

6. A single reel tape cartridge insertable into a tape drive apparatus comprising:
- a leader block;
- a length of tape connected at one end to the leader block;
- a tape reel on which the tape is wound;
- a base; and
- a cover, wherein the cover comprises a rear wall; two opposing side walls; a front wall; a substantially rectangular upper wall connecting the rear, front, and side walls, wherein the upper wall has an upper surface, a lower surface, and four corners; a leader block area formed in one of the corners of the upper wall; and a strengthening rib formed on the lower surface of the upper wall adjacent the leader block area; wherein the portion of the upper wall adjacent the strengthening rib and outside of the leader block area is at least as thick as the portion of the upper wall in the leader block area.

7. The cartridge of claim 6 wherein the portion of the upper wall in the leader block area is thinner than the portion of the upper wall adjacent the strengthening rib and outside of the leader block area.

8. The cartridge of claim 7 wherein the portion of the upper wall in the leader block area is at least 25% thinner than the portion of the upper wall adjacent the strengthening rib and outside of the leader block area.

9. The cartridge of claim 7 wherein the portion of the upper wall in the leader block area is at least 40% thinner than the portion of the upper wall adjacent the strengthening rib and outside of the leader block area.

10. The cartridge of claim 6 wherein the leader block area comprises a plurality of ribs extending from the lower surface of the upper wall to assist at least one of the insertion, removal, and housing of a leader block.

* * * * *